United States Patent [19]

Best

[11] 4,321,857

[45] Mar. 30, 1982

[54] INFRARED GAS GRILL

[76] Inventor: Willie H. Best, 18C The Heritage, Columbia, S.C. 29201

[21] Appl. No.: 138,854

[22] Filed: Apr. 8, 1980

[51] Int. Cl.³ .............................................. A47J 37/04
[52] U.S. Cl. .................................. 99/340; 99/421 H; 99/446; 99/467; 126/39 C; 126/41 R
[58] Field of Search ................ 99/339, 340, 446, 445, 99/467, 421 H; 126/25 R, 41 R, 39 C

[56] References Cited

U.S. PATENT DOCUMENTS

| | | | |
|---|---|---|---|
| 2,885,950 | 5/1959 | Stoll et al. | 99/340 |
| 3,763,846 | 10/1973 | Schantz | 126/41 R |
| 3,789,822 | 2/1974 | Schantz | 126/25 R |
| 4,108,055 | 8/1978 | Simmons | 99/339 |

*Primary Examiner*—Billy J. Wilhite
*Attorney, Agent, or Firm*—Newton, Hopkins & Ormsby

[57] ABSTRACT

A sheet metal cabinet supports a gas burner assembly below the forward portion of a shield, over which are a pair of removable primary cooking gridirons, having spaced, parallel, transversely extending U-shaped grids which cover the upper opening of the grill cabinet, the U-shaped grids having holes in their end portions so that the grease may drip onto a drip pan or grease tray which extends rearwardly of the burner assembly. A secondary gridiron or bake rack, is supported by a tubular upright rectangular hood assembly above the drip pan and over the rear portion of the primary gridirons. The hood has a front L-shaped access door hinged at the top of the hood by a transverse hinge. The burner assembly has tandem arranged burners with upwardly open, plenum boxes, the top portions of which are covered by a plurality of ceramic, juxtaposed, rectangular, foraminous, radiant burner elements. LP gas, from a tank carried within the cabinet, is fed through control valves which respectively control gas fed to the plenum chambers of the plenum boxes.

Auxiliary equipment includes a rotisserie which is removably carried by the hood, a smoke box within which moist wood chips are placed, the box being placed on the burner assembly for heating. One of the primary gridiron is selectively replaced by a deep fat frier which is suspended by the cabinet over one of the burners. The gridirons are also replaceable by a frying griddle.

41 Claims, 17 Drawing Figures

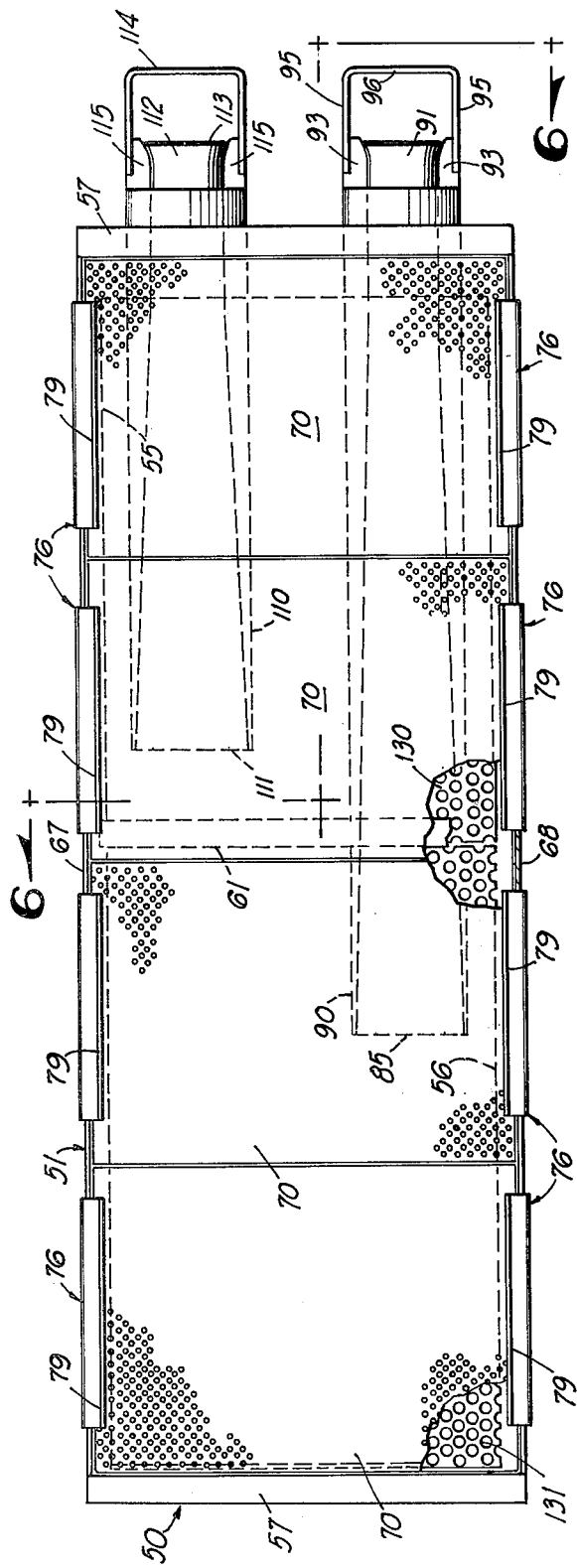
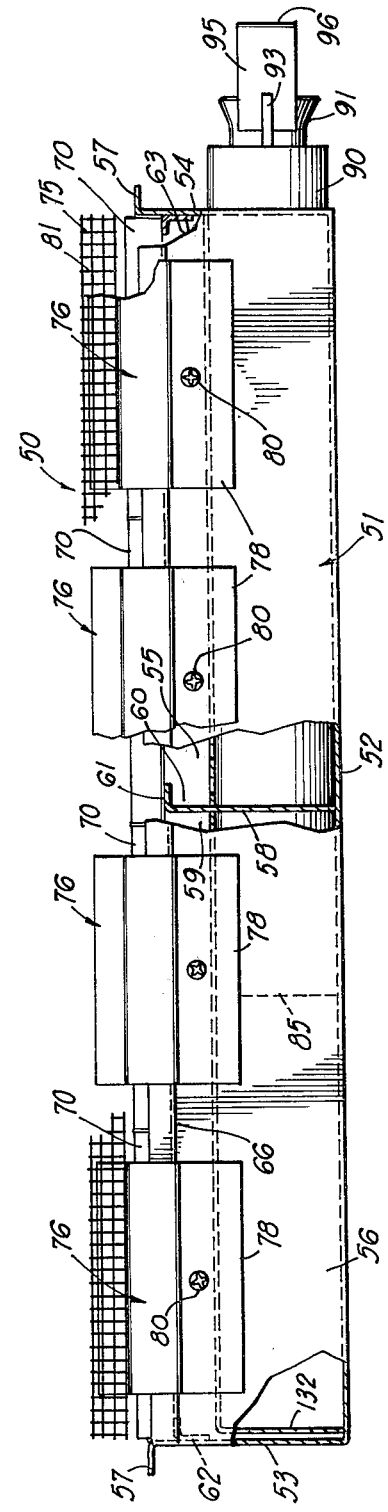
FIG. 4
FIG. 5

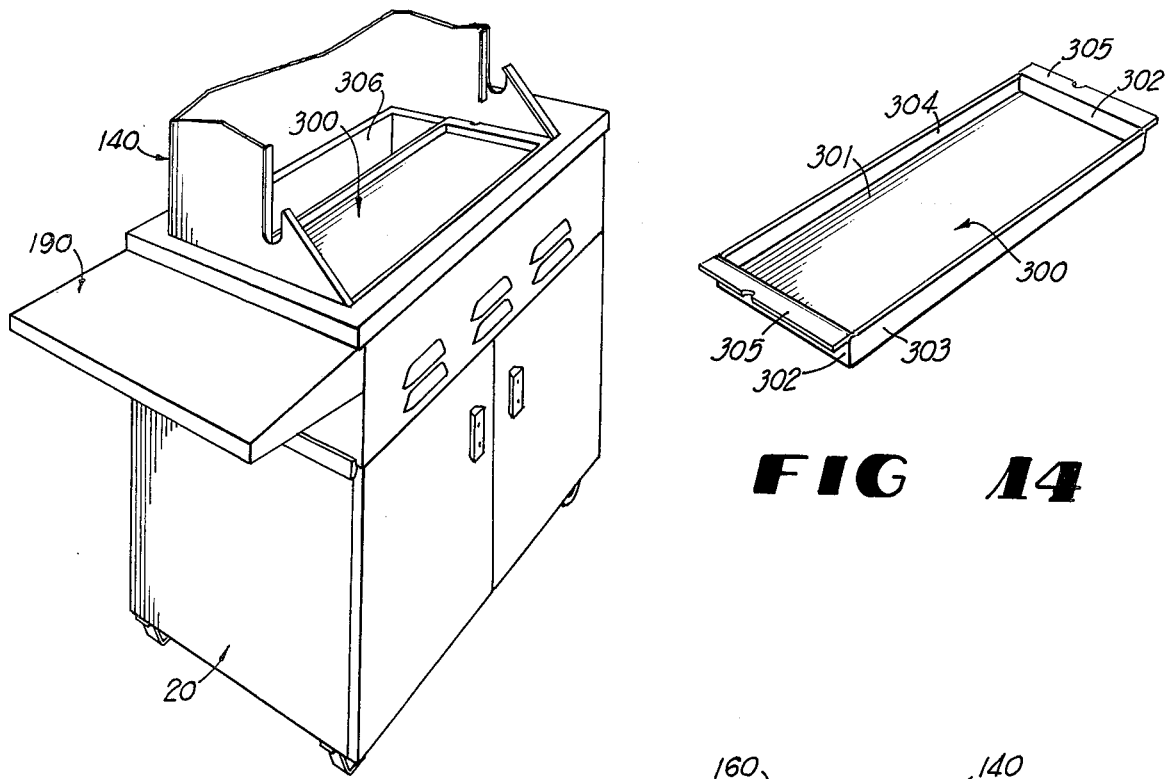
FIG 14
FIG 15
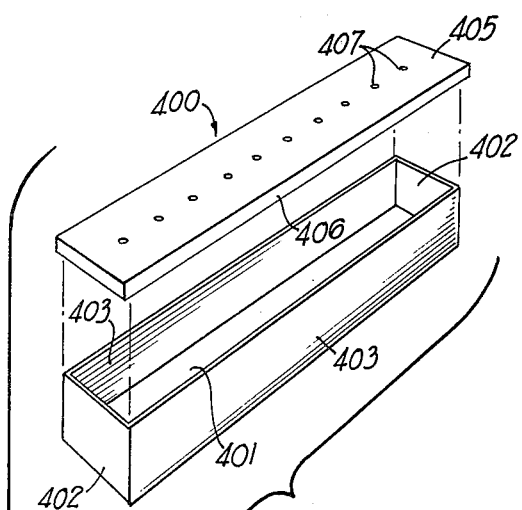
FIG 16
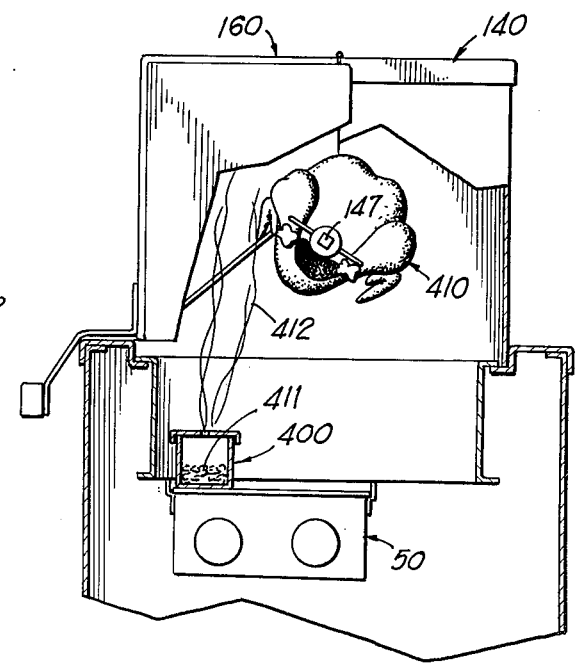
FIG 17

INFRARED GAS GRILL

BACKGROUND OF THE INVENTION

1. Field of the Invention

This invention relates to an infrared gas grill and is more particularly concerned with an apparatus and process for cooking food items, particularly meats.

2. Description of the Prior Art

In the past, numerous outdoor grills have been devised. Charcoal was primarily used as a fuel for such grills; however, more recently, both natural gas and liquified petroleum gas grills have become available on the market. Such prior art gas grills usually employ metal burners which are provided with a plurality of holes and through which combustible mixtures of gas and air are fed for heating refractory brickettes which are placed on a grate above the burner. The gases of combustion pass upwardly through a gridiron which supports the meat or other items to be cooked. The grease and other liquids from the meat drop onto the brickettes and are, at times, vaporized for producing the "charcoal flavor" characteristic of meats which are cooked over an open flame.

Also, in some commercial restaurants, radiant burners have been employed for cooking hamburger patties which are successively placed on the upper flight of a moving continuous chain conveyor which passes over a plurality of these radiant burners.

The prior art gas grills require several minutes in order to heat up the refractory brickettes, prior to the time that the grill is employed for cooking purposes. Such prior art grills generally do not distribute the heat evenly and, therefore, uneven cook the meats. With such prior art grills, it is usually difficult to sear the meat rapidly or assure that the meat is uniformly seared.

SUMMARY OF THE INVENTION

Briefly described, the present invention includes a tubular, upright, sheet metal cabinet which carries, below a heat shield a gas burner assembly including a pair of tandum burners having plenum boxes, the upper portions of which carry a plurality of ceramic, juxtaposed, foramimous, infrared, radiant, burner elements. Liquid petroleum gas contained in a tank within the cabinet supplies gas through valves to the plenum chambers of the plenum boxes, together with air to form a combustible mixture which passes through the holes or openings in the burner elements and is ignited and burns on the outer surface of the burner elements, heating the elements to incandescense for emitting, in an upward direction, convective heat and infrared radiation. Above the burner assembly is a cooking grate carried by a sheet metal top, the grate having a paif of removable gridirons, each having a plurality of spaced, parallel, U-shaped grids, the upper edges of which receive the meat or other food to be cooked. The drippings from such meat accumulate in the U-shaped grids and drain rearwardly through holes in the grid onto a grease pan disposed adjacent to one side of the burner elements. Such dripping also vaporizes in the trough of the grids to impregnate the "charcoal flavor" into the meat. Surrounding an area above the gridiron is a tubular sheet metal hood assembly which is a forwardly opening hood, which can be closed by a transversely hinged L-shaped door. In this hood assembly is a bake rack which has grids similar to the grids of the cooking gridiron.

Auxilliary equipment includes a rotisserie which is carried by the hood, a removable frying gridle which can be substituted for the grate and a deep fat fryer which can be substituted for the gridirons. The cabinet is also provided with a side tray for supporting the food and utensils. Also, there is a smoke box for receiving wood shavings so as to be heated by the burners to impart a smoke flavor to the food.

The grill of the present invention has a fast heat up time and will cook the meats or other foods quite rapidly, distributing the heat uniformly. The spaced troughs of channel shaped cooking grids receive and retain approximately one-half of the natural juices which drip from the meat and, thereafter, vaporize them directly under the meat so as to impart the "charcoal" flavor to the meat. The area of heating and the temperature can be controlled through an infinite range by manipulation of the valves. The central heat shield protects parts of the cabinet, which may come in contact with a person's body, from the heat. The juices of the meat, which drip between the spaced grids, are also vaporized but directly by the flame of the infrared burners and pass off as smoke without any appreciable soiling of the burners, themselves, thereby being vaporized back as flavor into the meat. Flare-up is reduced because all grease does not drop onto the surface of the burner, however, enough grease does burn to help impart the outdoor cooked flavor to the meats.

The infrared intensity of the burner is about three to four times greater than that generated by other conventional gas grills and will heat up in a matter of two to three minutes. A one inch steak, for example, will cook in four to five minutes.

Accordingly, it is an object of the present invention to provide an infrared gas grill which will heat up quite rapidly, providing uniform heat for cooking foods and will rapidly and evenly cook meats and other food items.

Another object of the present invention is to provide a grill which is convenient to use, easy to maintain and provides a superior cooked product in a short period of time.

Another object of the present invention is to provide an infrared radiant grill in which much of the grease from the food will be burned and vaporized, thereby imparting flavor to the meats or foods and also driving off a portion of this grease so that it does not collect inside the grill.

Another object of the present invention is to provide a grill which can be selectively employed as an open cooker and/or a cooking gridle, and/or a rotisserie and/or for deep fat fryer and/or a smoker.

Another object of the present invention is to provide a grill which can be readily and easily assembled and disassembled and which can be readily and easily cleaned.

Another object of the present invention is to provide a grill which has a long useful life and is made up of components which are readily and easily replaceable.

Another object of the present invention is to provide an infrared gas grill which is self contained and required little maintenance.

Another object of the present invention is to provide a grill in which the juices of the meat are captured immediately below the meat as it is being cooked so as to be heated and vaporized back into the meat to impart the outdoor cooked flavor to the meat.

Another object of the present invention is to provide a gas grill, most of the components of which are sheet metal stamped or shaped parts, the grill being inexpensive to manufacture, durable in structure and efficient in operation.

Another object of the present invention is to provide a process for cooking meats, which process is easily and conveniently carried out and will provide cooked meats which are tasty in short periods of time, preserving many of the juices within the meat.

Other objects, features and advantages of the present invention will become apparent from the following description when taken into conjunction with the accompanying drawings wherein like characters of reference designate corresponding parts throughout the several views.

BRIEF DESCRIPTION OF THE DRAWING

FIG. 4 is an enlarged top plan view of the burner assembly of the grill depicted in FIG. 1;

FIG. 5 is a side elevational view of the burner assembly depicted in FIG. 4;

FIG. 14 is a prospective view of the frying gridle which is utilized with the grill of FIG. 1;

FIG. 15 is a partially broken away prospective view of the grill of FIG. 1 receiving the frying gridle of FIG. 14;

FIG. 16 is a prospective view of the smoke box which is utilized with the grill of FIG. 1; and FIG. 17 is a fragmentary, side elevational view, partially broken away of the upper portion of the grill of FIG. 1 employing the smoke box depicted in FIG. 16.

DESCRIPTION OF THE PREFERRED EMBODIMENT

Figure 1:
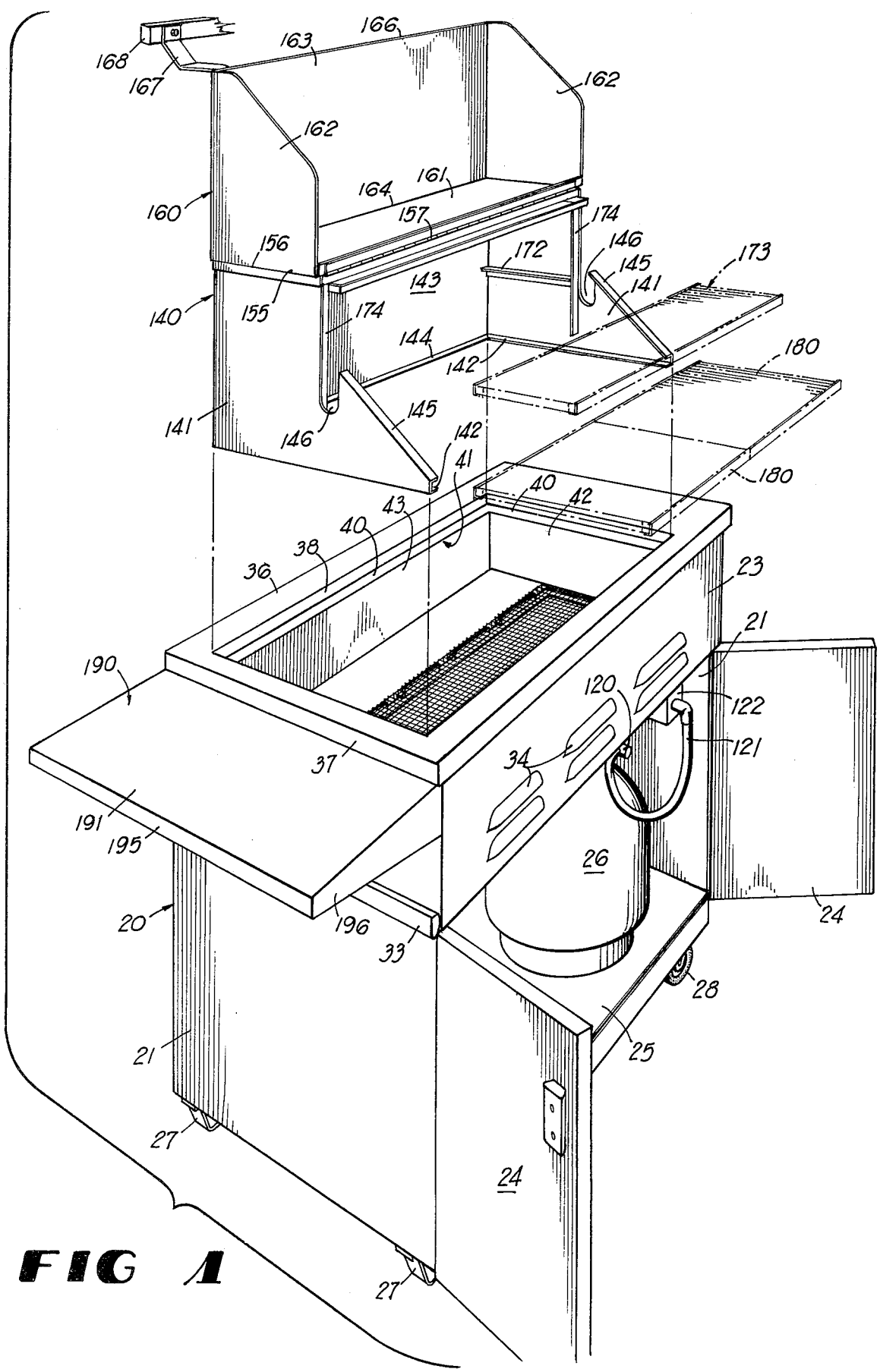
FIG. 1 is an exploded perspective view of an infrared gas grill constructed in accordance with the present invention.

Referring now in detail of the embodiments chosen for the purpose of illustrating the present invention, numeral 20 denotes generally an upright, sheet metal cabinet of the grill depicted in the drawings. This cabinet 20 is a rectangular member having an open interior defined in part by opposed parallel side walls 21, the rear ends of which are joined by a back wall 22. The upper portion of the front edges of the side walls 21 are joined by a front panel 23, below which are a pair of opposed front doors 24 hinged respectively to the front edges of the walls 21. In the lower portion of the cabinet 20 is a bottom 25 on which rests a liquified petroleum i.e., propane tank 26. The propane tank 26 is retained in place by clamps (not shown). Mounted at the bottom corners along one of the walls 21 are a pair of feet 27 while mounted at the corners adjacent the outer wall 21 are a pair of casters, such as caster 28. Thus, by lifting the side of the cabinet 20 which contains the feet 27, the grill may be rolled from place to place, as desired.

Above the plane of the upper edge of doors 24, the rear wall 22 is provided with a drip pan or grease tray receiving bracket 30 while the lower inner edge portion of the front panel 23 is provided with a similar bracket 31. The opposed brackets 30 and 31 run horizontally longitudinally throughout substantially the entire length of the cabinet 20 and slideably receive by their edges, a slideable drip pan or grease tray 32. One end of pan or tray 32 extends through a slot (not shown) in one of the walls 21 and is provided with an external handle 33. Thus, the tray 32 is readily removable, being slidable on the brackets 30 and 31.

Above the tray 32, the front panel 23 and the back wall 22 are provided with outwardly protruding horizontally disposed louvers 34 which permit ambient air to enter the upper portion of the interior of the cabinet 20.

The upper edges of the walls 21 and 22 and the panel 23 at the open upper end of the tubular cabinet 20 are provided with inwardly turned flanges 35 which are disposed in a common horizontal plane. Received on these flanges 35 is a removable flat, sheet metal, rectangular, top plate 36 having downwardly extending, perimetrical flanges 37 which overlap the walls 21 and 22 and the panel 23, as seen in FIG. 2.

The central portion of the top plate 36 is provided with a relatively large rectangular opening which is defined by downwardly turned flanges 38, the lower edge portions of which are provided with inwardly extending ledges 39 disposed in a common horizontal plane, parallel to and below an upper surface of the top plate 36. These ledges 39 removable receive on their upper surfaces the outwardly protruding flanges 40 of a removable sheet metal rectangular tubular fire wall or shield, denoted generally by the numeral 41. The shield 41 is an upright rectangular tubular member, smaller than the cabinet 20 for forming a heat shield which protects the cabinet 20. Shield 41 includes a pair of opposed, parallel, vertically disposed side walls 42, a back wall 43 which is perpendicular to the walls 42 and joined the rear edges thereof and a front wall 44, the lower edges of the walls 43, 43 and 44 are provided with flanges 45 which protrude outwardly in a common horizontal plane. The outer dimensions of the flanges 45, however, are less than the inner dimensions of the ledges 39 so that the shield 41 is solely supported or suspended by the ledges 39 and readily removable by lifting it upwardly.

Figure 2:
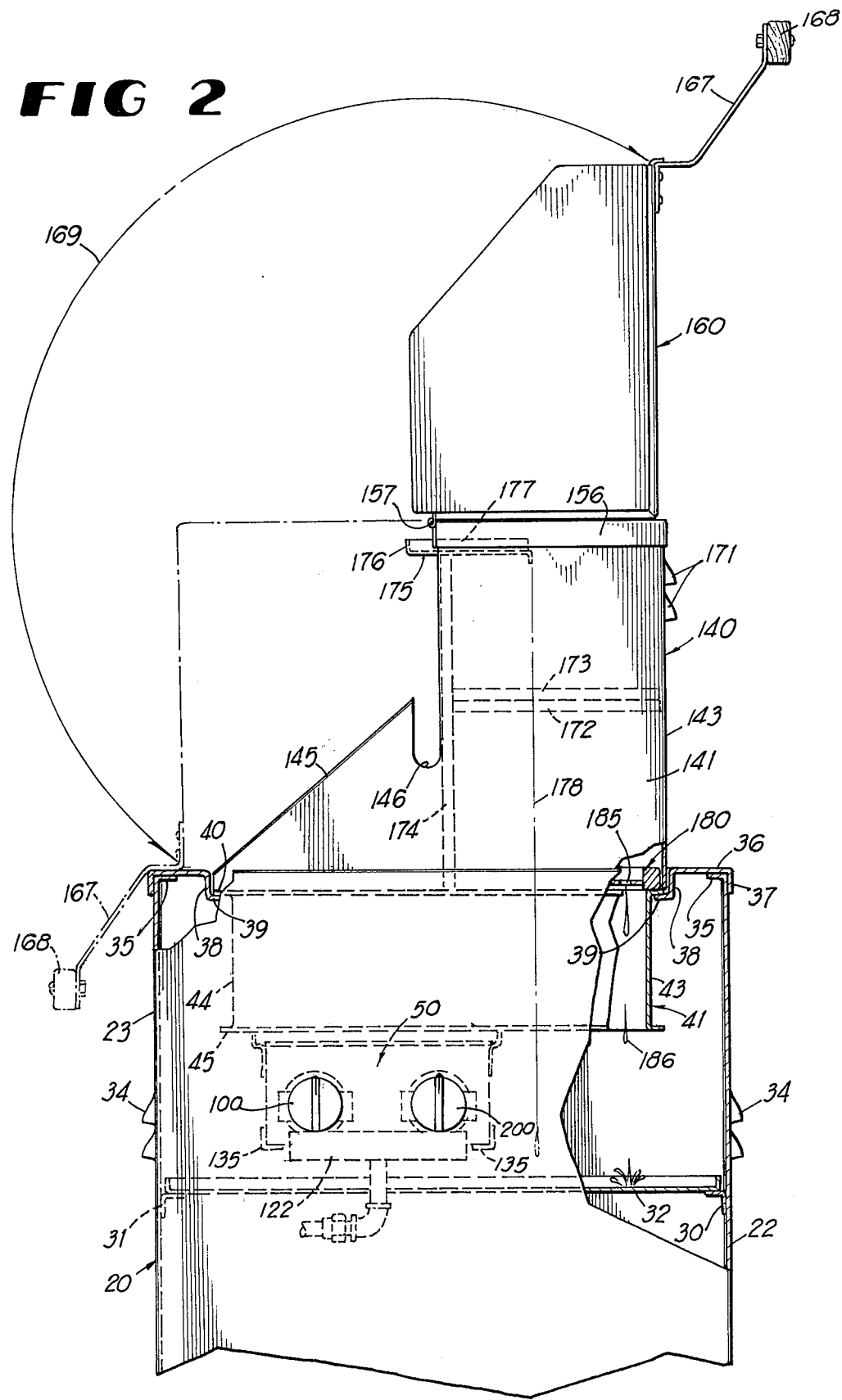
FIG. 2 is a side elevational view of the upper portion of the grill depicted in FIG. 1.
Figure 6:
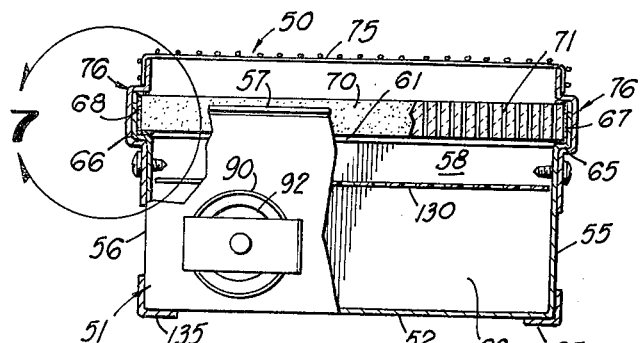
FIG. 6 is a cross sectional view taken substantially along lines 6—6 in FIG. 4.

As best seen in FIG. 2, the lower end of shield 41 terminates approximately half way between the top plate 36 and the tray 32. Below the lower surface of the shield 41 is an infrared radiant gas burner assembly, denoted generally by the numeral 50. In the embodiment herein depicted, the burner assembly 50, as best seen in FIGS. 4 through 6, includes a rectangular plenum box, denoted generally by the numeral 51, which is formed of sheet metal, including a flat rectangular bottom 51, a pair of opposed end plates 53 and 54, a back plate 55 and a front plate 56 formed into boxlike structure open along its top side. The end plates 53 and 54 are provided along their upper edges with outwardly protruding flanges 57, seen in FIG. 5.

Within the interior of the plenum box 51 there is a central transverse partition 58, also seen in FIG. 5, which separates the plenum box into a left plenum chamber 59 and a right plenum chamber 60. The upper edge of the partition 58 is provided with a flange 61, the upper surface of which is in a common horizontal plane with the upper surface a pair of opposed, parallel brackets 62 and 63 which are mounted on the inner surfaces of the end plates 53 and 54, respectively.

Figure 7:
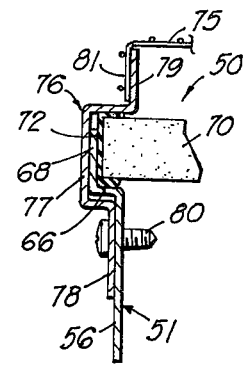
FIG. 7 is an enlarged fragmentary vertical sectional view of that portion of the burner assembly encircled by line 7—7 in FIG. 6.

The upper edge portions of the front plate 56 and the back plate 55 are bent outwardly to provide burner element carrying flanges 65 and 66, seen best in FIGS. 6 and 7. The outer edges of the flanges 65 and 66 are turned upwardly to provide retaining plates 67 and 68 for the burner elements 70. Each of the burner elements 70 is a flat rectangular ceramic member having a plurality of holes or gas passageways 71 extending vertically therethrough. The holes 71 are arranged in transversely, parallel and longitudinally, parallel rows, the holes 71 of one row being offset with respect to the holes 71 of the adjacent rows. The upper surfaces of the flanges 61, 62 and 63 are in a common plane with the flanges 65 and 66 so as to support a plurality (four) of the rectangular burner elements in juxtaposition, as shown in FIGS. 4 and 5, there being provided fiber frax gaskets, such as gaskets 72, around the edges of each of the burner elements 70 so as to prevent the escape of gases around these edges. Thus, a ceramic, infrared, radiant burner is provided over each of plenum chambers 29 and 60. The combustible mixture of gas and air in the plenum chambers 59 and 60 will, therefore, pass upwardly through the holes 71 in the ceramic elements 70, to be ignited manually or electrically on the flat horizontal outer surface of the burner when the grill is to be utilized. The gas thus heats the ceramic burner elements 70 to red hot incandescence to radiate infrared heat so that meat or food item disposed thereabove will be cooked by infrared radiation and convection heat, the space in the cavity between the gridirons 180 and the burner being essentially open and unobstructed.

For removably retaining the burner elements 70 in place, and for providing support for an open mesh screen invented channel shaped guard 75, the outer upper edges of the front and rear plates 55 and 56 are provided with a plurality of sheet metal retaining lugs, denoted generally by the numeral 76. Each retaining lug 76 is formed of rectangular sheet metal stamped to provide a central channel 77 with a lower downwardly protruding flange 78 and an upper upwardly protruding flange 79. A bolt 80, passing through the lower flange 78 and thence through the wall 56 or 55, as the case may be, secures the lug 76 in place so that its central channel 77 extends around the edge of the burner element 70 and its support 68 and, thence, inwardly over the upper edge portion of the burner 70, whereby the upper flange 79 protrudes above the burner surface and receives a downwardly extending side flange 81 of the guard 75. As seen in FIGS. 4 and 5 the lugs 76 are provided in longitudinally spaced relationship along the upper edge portions of the front plate 56 and the back plate 55 so that a pair of opposed lugs 76 extend over opposite edge portions of and retain each of the burner elements 70. When so positioned, the upper flanges 79 are aligned in opposed parallel longitudinal rows for receiving the overlying flanges 81 of the guard 75 as shown in FIG. 5.

Within the plenum chambers 59 and 60 are a front pair of venturies forming an air-fuel supply member, the front larger pipe 90 extending through the wall 54 and, thence, through the partition 58 to terminate with its inner discharge end 85 adjacent to but spaced from the wall 53. The smaller front pipe 91 is disposed concentrically in the throat of the outer pipe 90, annular area therebetween permitting air to enter the pipe 90 and cooling the venturi and the venturi pipe 91 being flared at its outer end 92 to receive the gas and to inject the combustion air. Diametrically deposed spaced plates 93 support the inner pipe 91 in its spaced relationship to the outer pipe 90. The outer end 92 of the pipe 91 protrudes outwardly of the end of the pipe 90. The spacer plates 93 support by the legs 95, a U-shaped bracket, the transverse base 96 of the bracket joining the outer ends of the opposed, parallel legs 95. The base 96 is provided with a central hole 97 through which protrudes the nozzle 98 which is carried by a valve 99 having a control knob 100. The valve 99 is mounted on the inner surface of wall 21 and the stem 101 of the control knob protrudes through the wall 21 so that the knob 100 is on the exterior side of the side wall 21.

The burner assembly 51 is also provided with a second tube 110 which forms a heat shield for the venturi, the inner discharge end 111 of which terminates within the plenum chamber 60. The tube 110 protrudes outwardly through the wall 54, being disposed parallel to and rearwardly of the pipe 60. The outer end of tube 110 receives the inner venturi 112 with its flared end 113 in the same manner as the pipe 90 receives the venturi 91. The U-shaped bracket 114 is identical to the bracket which includes the legs 95 and the base 96 and is supported by the plates 115 which are identical to the plates 93. The base of the bracket 114 has a central hole (not shown) through which projects the nozzle of a second gas valve (not shown) which is controlled by a control knob seen in FIG. 2. The valve (not shown) or control knob 200 is identical to the valve 99 so that the control knobs 100 and 200 which are disposed adjacent to each other outwardly of the wall 21 respectively control the gas being fed to the plenum chambers 59 and 60.

For supplying this gas, the LP tank 26 is provided with the usual regulator valve (not shown) and on-off valve 120, seen in FIG. 1 which, in turn, is connected through a hose 121 to a fuel distribution manifold 122. The fuel distribution manifold 122 feeds gas to the valves, such as valve 99.

Within the plenum chambers 59 and 60 are a pair of perforated sheet metal diffusion grids 130 and 131. Grid 130 is a horizontal rectangular grid with spaced holes 129 therein. Grid 130 is parallel to and below the burner elements 70 of the right plenum chamber 60, being tack welded to the upper surfaces of both the pipe 90 and the pipe 110 so as to extend across the entire area of the plenum chamber 60, above the pipe 110 which introduces the gas air mixture to the chamber 60. The function of the grid 130 is to mix the air and gas more thoroughly so that it is introduced as a uniform mixture up through all of the holes 71. In similar fashion the perforated grid 131 extends over the central portion of the plenum chamber 59, an is bent downwardly to provide a vertical support 132 at the outer end of the plenum chamber 59. This grid 131 is tack welded to the upper surface of that portion of the pipe 90 which protrudes into the plenum chamber 59.

Figure 8:
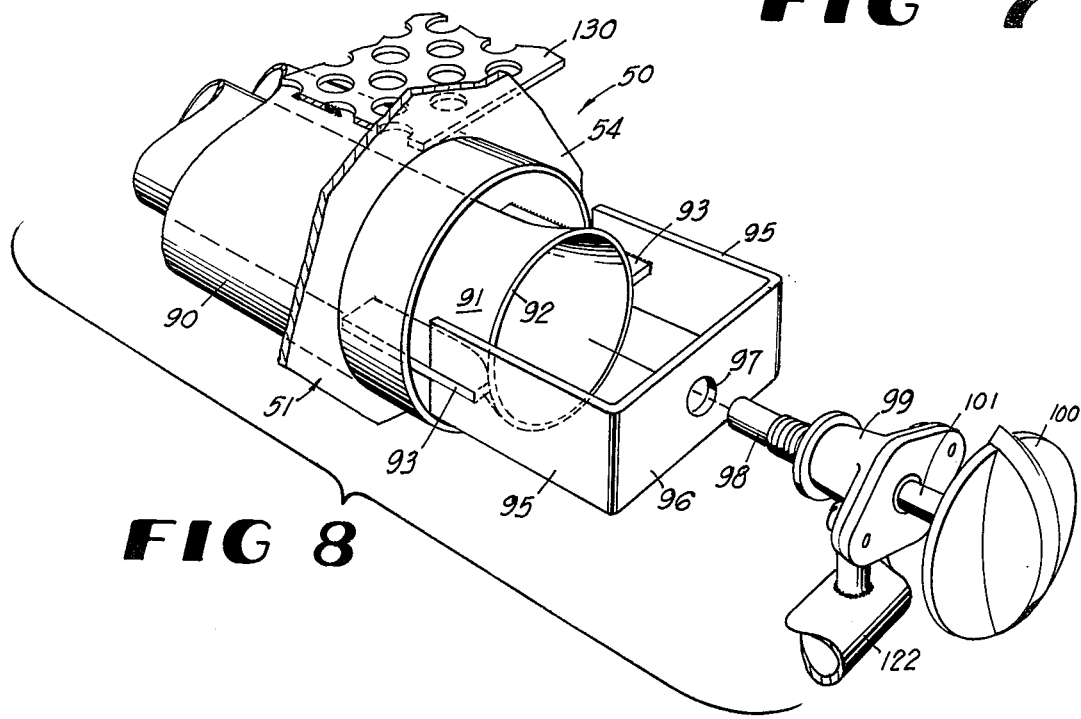
FIG. 8 is an enlarged exploded, fragmentary, prospective view of a portion of the burner assembly, showing the control valve and fuel nozzle which are part of the burner assembly.

A pair of opposed, parallel L-shaped burner assembly support bars 135 extend between the walls 21 and removably support the front and rear lower edge portions of the burner assembly 50. When appropriately supported, the nozzles, such as nozzle 98, removably protrude through the holes, such as holes 97, seen in FIG. 8. The burner assembly 50, however, is readily removed by sliding and lifting it so that access can be had to the burners, should they require cleaning or maintenance. It will be understood, of course, that in the event that it is desirable to remove the burner assembly 50, the heat shield 41 will first be lifted from the cabinet 20 and thereafter the burner assembly 50 can be readily lifted out of its position.

From FIGS. 1 and 2 it will be seen that the width, from front to back, of the burner assembly 50 is approximately one-half the width, from front to back of the shield 41 from wall 43 to wall 44 and that the burner assembly 50 is disposed below the forward portion of the fire well, defined by the heat shield 41, thereby leaving open the rear portion of the heat shield 41.

Figure 3:
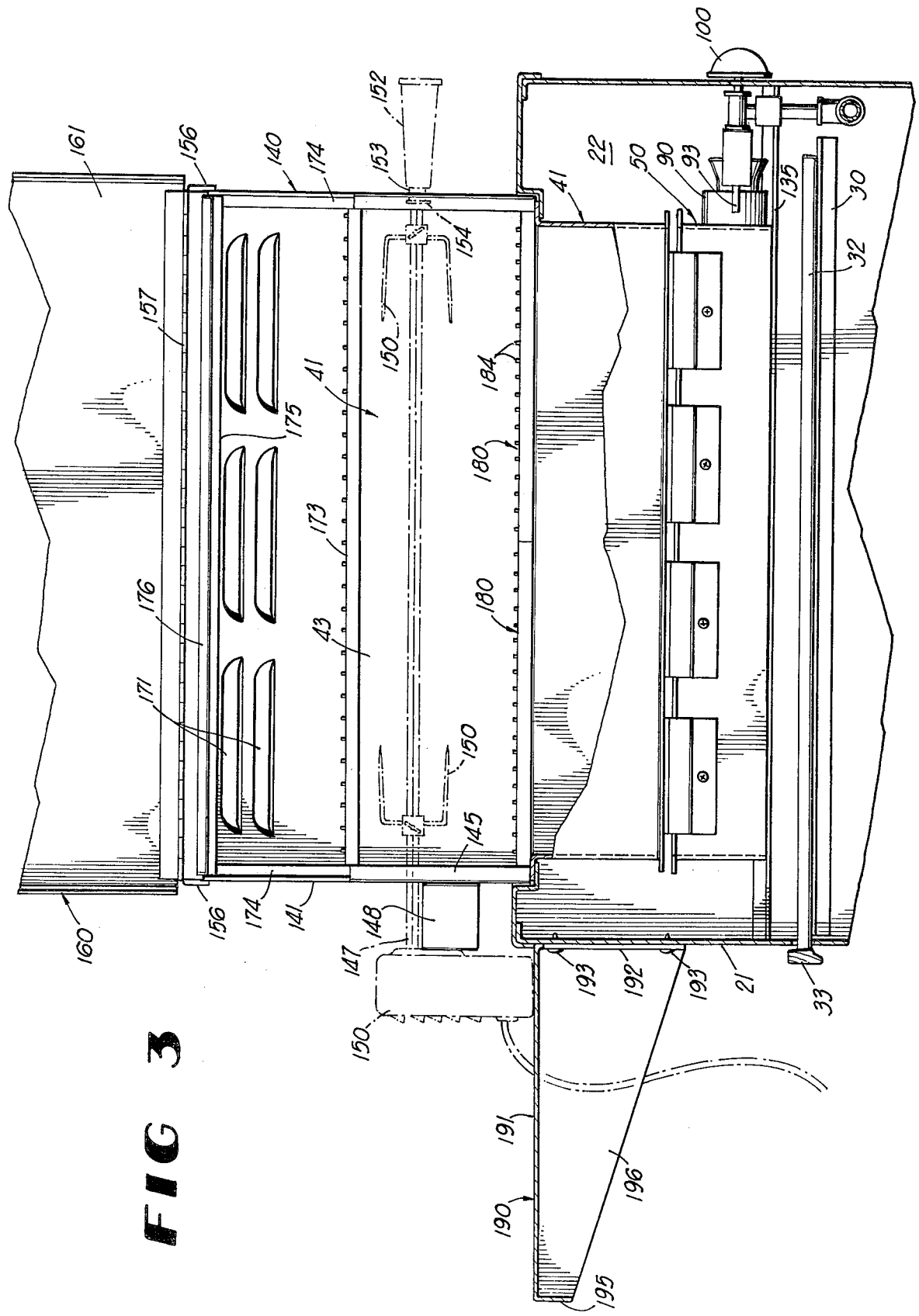
FIG. 3 is a front elevational view of that portion of the grill depicted in FIG. 2.

A sheet metal hood assembly, denoted generally by the numeral 140 and seen best in FIGS. 1, 2 and 3, is disposed over the fire well defined by the heat shield 41. This hood assembly 140 includes a pair of upright parallel end panels 141, the lower of edges of which are provided with inwardly turned flanges 142. The rear edge portions of the parallel panels 141 are joined by a vertical, rectangular back panel 143. The back panel 143 is provided with an inwardly extending flange 144 in a common horizontal plane with the opposed inwardly protruding flanges 142. The dimensions of the hood assembly 140 are such that the flanges 142 rest upon the side flanges 40 above walls 42 of the heat shield 41 while the flange 144 rest upon the rear flange 40 of the wall 43. The width of the panels 141 are approximately equal to the width between flanges 38 and, therefore, there will be essentially no play when the hood assembly 140 is mounted in place, as illustrated in FIGS. 1, 2 and 3. The side panels 141 have rear portions which are generally rectangular and forward portions which are of less height and generally triangular, tapering forwardly to a very narrow front portion. Each of the panels 141 has a straight inclined portion with an inwardly extending flange 145, thereby providing a pair of opposed parallel flanges 145 disposed in a common rearwardly and upwardly inclined plane. The inner ends of the flanges 145 terminate in the central portion of the panels 141. Rearwardly of such termination, the panels 141 are provided with U-shaped upwardly opening slots 146, which receive the end portions of a rotisserie spit 147, shown in broken lines in FIG. 3. Mounted by a bracket 148 to an outer side of one of the panels 141 is an electrical motor 150 the driving end portion of which removably receives the pointed end of the spit 147 for rotation. As is usual, the spit 147 has inwardly directed tines or prongs 151 which are adjustable along the length of the spit 147 for engaging an item of food, such as meat, on the spit 147. Spit 147 thus supports the meat vertically above the central portion of the fire well of shield 41. The end opposite to the pointed end of the spit 147 is provided with a handle 152, seen in FIG. 3. Adjacent to this handle is a circular metal bearing 153 which has an inner flange 154. The function of the bearing 153 is to ride in one of the slots 146 to support that end portion of the spit 147 for rotation. The radial flange 154 prevents outward movement of the spit 147 until the spit 147 is lifted out of the slots 146.

The upper end of the hood assembly is a flat rectangular, horizontally disposed, top plate 155 which extends between the upper edge portions of the rectangular portions of the panels 141 and also is secured to the upper edge portion of the back panel 143. A perimetrical flange 156, extending from the edges of the top plate 155 overlap the upper end portions of the panels 141 and 143 while the perimetrical flange 156 protrudes downwardly at the front of the top plate 155.

Mounted along the front surface of this front portion of the flange 156 is one element of a piano hinge 157, the other element of which is fixed to the outer edge of an access door denoted generally by the numeral 160. This access door 160 includes a rectangular top plate 161, a pair of side plates 162 and a front plate 163. The front plate 163 is perpendicular to the top plate 161 and is secured thereto along a common edge 164. The outer edge of the top plate 161, which is parallel to the common edge 164, is provided with an inwardly turned flange which receives the other element of the piano hinge 157. Adjacent to the outer edge 166 of the front panel 163 are a pair of spaced, Z-shaped, handle carrying brackets 167 which when the access door is closed, extend outwardly and then downwardly from the outer surface of the front panel 163. Brackets 167 carry a handle 168, by means of which the access door 160 may be pivoted from the position shown in full lines in FIG. 2, through an arc defined by the arrow 169, to a closed position depicted in broken lines in FIG. 2. In the closed position, the end plates 162 are disposed outwardly of the end panel 141 and, therefore, overlap the flanges 145 so that the lower edge 166 of the front panel 163 rests upon the upper surface of the top 36 while, at the same time, the end plates 162 close the open portions of the panels 141 except for the lower portions slots 146. Thus, when access door 160 is closed, such as during the operation of the rotisserie depicted in FIG. 3, it temporarily forms an upright tubular rectangular sheet metal member over the gridiron, the top there being closed by the horizontal end plate formed by top plates 155 and 161 to restrict the passage of the products of combustion out of the grill assembly.

The back panel 143, as seen in FIGS. 2 and 3 are provided with a plurality of louvers 171, through which the smoke may escape when the hood assembly is in its closed position.

In the interior of the hood 140 are a pair of opposed brackets 172 on panels 141 which are disposed in a common horizontal plane and are spaced below the plane of the top plate 155 for removably receiving a baking rack 173 by its end portions. Reinforcing struts 174 along the outer vertical edges which define the slot 146, reinforce the end panels 141.

Below the hinge 157 is a drain pan or tray 175, the drain pan being a flat, rectangular member having a front flange 176 and side flanges 177. These flanges 176 and 177 project upwardly so as to confine any water which drips through the hinge 157 and direct the water rearwardly to the rear edge of the plate 175. The flanges 177 are secured to the inner surfaces of the end panels 141 so that the plate 175, while being spaced slightly below the surface of the top plate 155, protrudes forwardly beyond the front edge defined by the hinge 157 so that all water dripping from the hinge 157 will be received by the tray 175 and directed rearwardly where the water drops in a path indicated by the broken line 178 onto the drip pan 32. It will be understood that the rear edge portion of the pan 175 is vertically rearwardly of the burner assembly 50 so that there is no danger of the water dripping onto the hot burner elements 70.

At the plane of the top plate 36 is the food supporting means namely the primary grill which extends over the upper portion of the fire well defined by the shield 41. This primary grill includes a pair of identical, horizontal, grates or gridirons 180 which are vertically spaced above, parallel to and extend over the plenum chambers 59 and 60 respectively and rearwardly over the remainder of the fire well. Each grate or gridiron 180 is supported at its front by the front portion of the flange 39 and at its rear by the rear portion of the flange 39, these front and rear portions extending parallel to each other and parallel to the front panel 23 and the rear panel 22.

Figure 9:
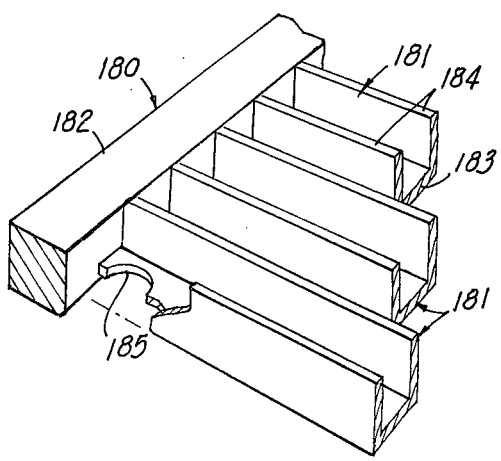
FIG. 9 is an enlarged fragmentary prospective view of a portion of the cooking gridiron of the grill depicted in FIG. 1, in an upright position for cooking meats.
Figure 10:
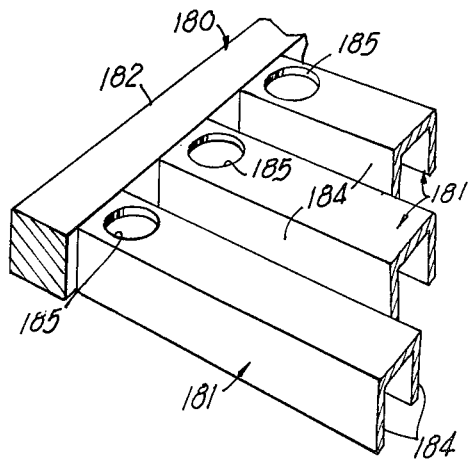
FIG. 10 is a view similar to FIG. 9 but showing the gridiron in an inverted cooking position with respect to FIG. 9.

As best seen in FIGS. 9 and 10, each primary grate or gridiron 180 includes a plurality of spaced, transversely extending, parallel U-shaped or channel shaped trough defining grids 181 which are joined at their ends by longitudinally extending member 182. Each of the grids 181 includes a horizontally disposed base 183 and a pair of opposed, parallel, spaced, side flanges 184 which project from the edges of the base 181. The bases 181 of the grids 181 are in a common horizontal plane which is parallel to the common horizontal plane of the upper edges of the flanges 184.

Adjacent to the rear angle iron 182, the base 183 of each of the grids 181 is provided with a drain hole 185 which are aligned with each other transversely of each grate 180. When a grate 180 is in its normal position, as shown in FIG. 9, with the channel members opening upwardly, any excess fluids which are not vaporized in the cooking operation will be directed by the channels or grids 181 rearwardly so that the fluid drops through the hole 185 and thence onto the drip pan 32, as illustrated by the droplets 186 and 187 in FIG. 2.

When, however, a grate 180 is inverted as illustrated in FIG. 10, the grate 180 no longer performs its function of catching the juices.

In FIGS. 1 and 3 it is seen that a side shelf 190 projects sidewise from the wall 21. This side shelf 190 includes a flat, rectangular tray panel 191 having a downwardly protruding flange 192 secured along one edge thereof. The flange 192, in turn, is secured by bolts 193 to the outer surface of the wall 21 so as to dispose the upper surface of the rectangular panel 191 immediately below the lower edge of the flange 37, as illustrated in FIG. 3. The panel 191 is reinforced by a downwardly extending end flange 195 and side flanges 196. The width of the panel 191 is approximately equal to the width of the cabinet 20. The function of the side tray 190 is to provide a counter on which plates, utensils, and other paraphernalia may be readily stored for use in conjunction with the grill. Also, the counter acts as a handle by means of which one end of the cabinet 20 is lifted for moving it from place to place.

Figure 11:
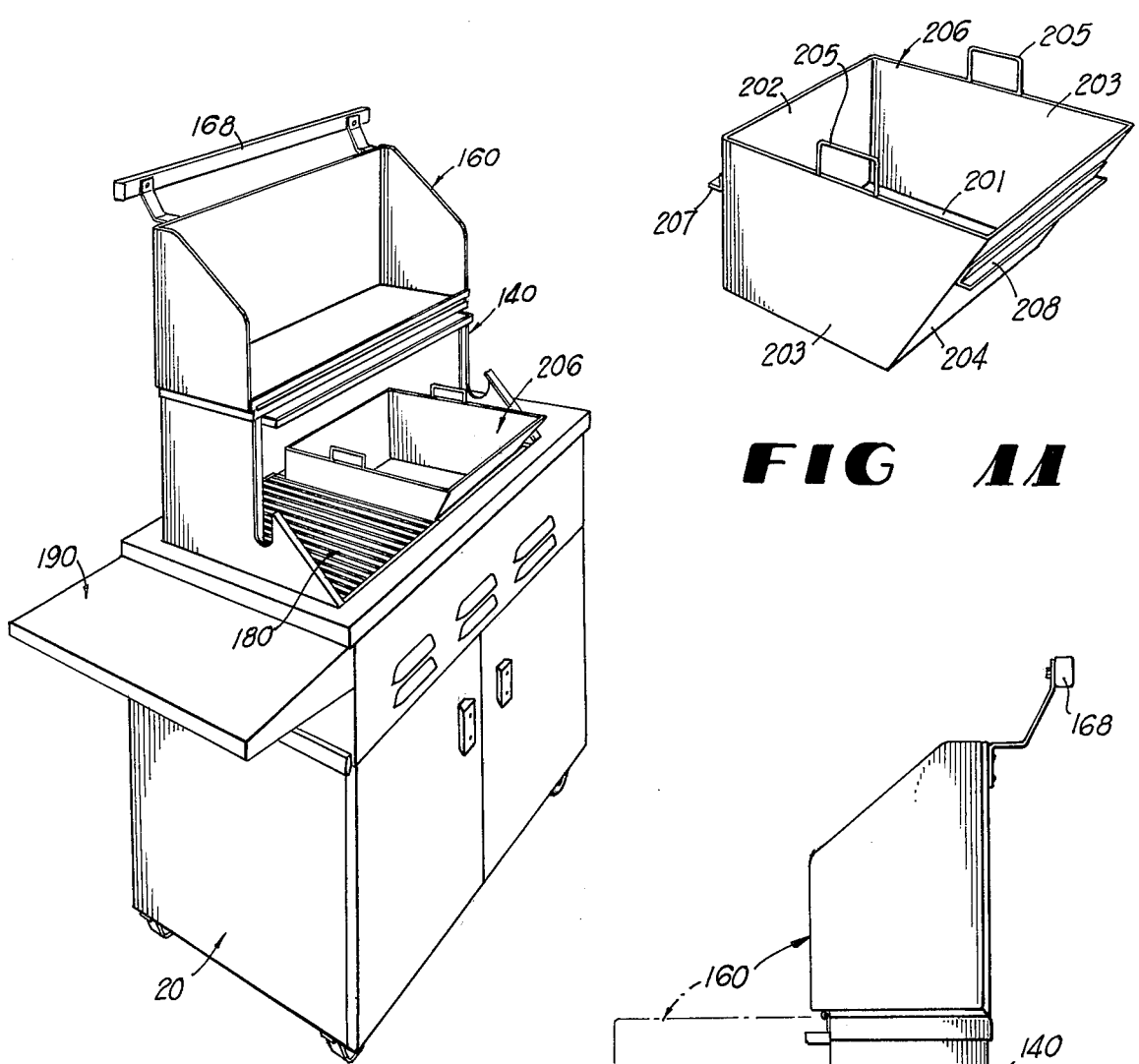
FIG. 11 is a prospective view of the deep fat fryer which is utilized with the grill depicted in FIG. 1.
Figure 12:
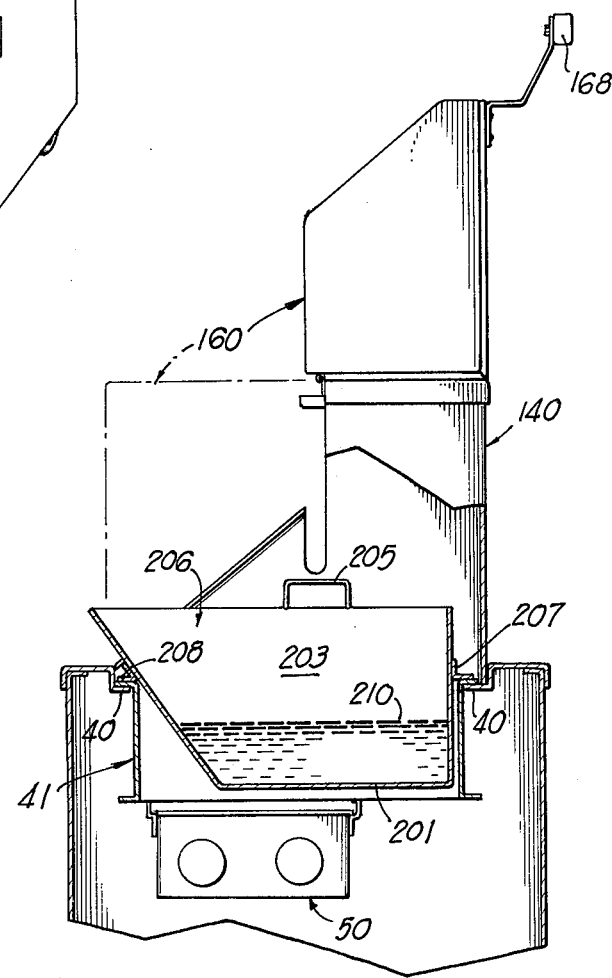
FIG. 12 is a prospective view of the deep fat fryer of FIG. 11 installed in the grill of FIG. 1.
Figure 13:
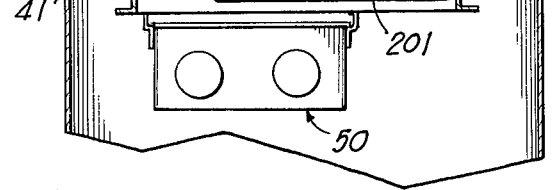
FIG. 13 is a partially broken away side elevational view of a portion of the grill depicted in FIG. 12.

The auxiliary equipment such as the deep fat fryer 206 illustrated in FIGS. 11, 12 and 13 are adapted to be substituted for the grates 180. In FIG. 11, it is seen that the deep fat fryer includes a vat having a flat, rectangular bottom 201, a flat, rectangular back 202, a pair of opposed, parallel sides 203 and an upwardly and forwardly inclined front panel 204. The front panel 204 is joined to the forward edges of the sides 203. A pair of U-shaped bails 205 mounted on the upper edges of the sides 203 provide handles by which the deep fat fryer 206, thus formed, can be lifted and transported from place to place.

For being received appropriately in the cabinet 20, the deep fat fryer 206 is provided with front and back supporting flanges 207 and 208 disposed along the back 202 and the front panel 204. The lower, outwardly protruding flange of the angle irons which form the brackets 207 and 208 are disposed in a common horizontal plane parallel to but spaced below the upper edge of the deep fat fryer 206 and also parallel to the bottom 201.

The deep fat fryer 206 is installed in the cabinet 20 by removing one of the grates 180 and by inserting the deep fat fryer 206 as indicated in FIGS. 12 and 13. It will be observed in FIG. 13 that the brackets 207 and 208 are spaced apart by approximately the length of one of the grills 180 from front to back so that the outwardly extending flanges of the brackets 207 and 208 rest respectively upon the front and rear flanges 40 of the fire shield 41. When so positioned, the bottom 201 of the deep fat fryer is spaced above the upper surface of the burner assembly 50, as illustrated in FIG. 13. Thus, the flame from the burner assembly 50 will heat the oil denoted generally by the numeral 210 sufficiently for deep fat frying purposes. Panel 204 does not protrude forwardly over the top 36 sufficiently to interrupt the pivoting of the access door. It will be understood that if desired, natural rosin may be substituted for the frying oil or liquid 210 and that whole potatoes may be deposited in this rosin for cooking. Such potatoes, when raw, initially will sink in the rasin and will float to the surface when they are done.

Another accessory, which can be used in the grill of the present invention, is the gridle, denoted generally by the numeral 300 in FIGS. 14 and 15. This gridle 300 has a flat rectangular bottom 301 and upstanding side flanges 302 as well as upstanding front and rear flanges 303 and 304, respectively. The flanges 302, 303 and 304 are joined at their corners, as illustrated in FIG. 14, so as to retain any grease within the confines of the gridle 300. The upper edges of the side flanges 302 are turned outwardly to provide opposed, parallel, outwardly protruding, support brackets 305. The gridle 300 is utilized in the grill in the present invention by removing both of the grates 180 and by inserting the gridle 300 in its place above the burners 50, the brackets 305 resting upon the end flanges 40. The gridle 300 is less wide, from front to back, than the fire well and, hence, the products of combustion can pass upwardly through the opening 306 of the fire well, rearwardly of the gridle 300 (see FIG. 15).

In FIGS. 16 and 17 is illustrated another accessory, namely a smoker, denoted generally by the numeral 400. This smoker 400 includes a hollow interior smoker box having a flat, rectangular bottom 401, opposed square or rectangular ends 402 and opposed, rectangular upstanding sides 403. The upper side of the box, thus formed, is open and removably receives a cover 405 which has a perimetrical flange 406 which protrudes downwardly so as to overly the upper edge portions of the ends 402 and the sides 403. A plurality of holes 407 are provided in the cover 405.

The smoker 400 is utilized by installing moist wood chips, such as hickory chips, in the box and then closing the box by installing the cover 405 thereon. Thereafter, the bottom 401 is placed directly on the screen guard 75 of the burner assembly 50. The smoker 400 is particularly useful when utilized with the rotissierie as depicted in FIG. 17. In that figure, a turkey 410 is illustrated as being received on the spit 147, the spit being rotated by the motor 150. The heat from the burner assembly 50 will heat the wood chips 411 contained in the smoker 400 sufficiently to emit the characteristic fumes or vapors 412 up through the holes 407. When utilizing the smoker 400, it is preferable that the access door 160 be in the closed position as illustrated in FIG. 17. Of course, if desired, the smoker may be utilized in connection with the grates 180 for smoking meats which are grilled on the grates.

In operation, one or both of the burners are lighted by placing a match adjacent to the upper surfaces of the appropriate ceramic burner elements 70. Thereafter, the handle 100 or 200 is turned sufficiently to open its associated valve, such as valve 99. It takes only about one or three minutes for the ceramic elements 70 to become red hot and, thereafter, the grill may be utilized. If it is desired to impart a "charcoal" flavor to the meat being cooked on the grates 180, it is preferable to install the grates 180 in the position shown in FIG. 9 so that approximately one half of the drippings from the meat will be retained in the horizontally disposed channels of the grids 181.

It is, therefore, seen that the gridirons or grates 180 support the meat at spaced locations along the lower surface of the meat to expose spaced increments of this surface to the direct rays of the infrared radiation convection heat of the burner elements 70 while the troughs of grates 180 shield other increments of the meat and collect the juices of the meat immediately below these shielded increments of the meat. Since these troughs in grates 180 are also heated, a portion or most of the collected juices are vaporized and carbonized to impact the charcoal flavor to the meat while the juices which drip toward and perhaps onto the burner elements 70 are vaporized by the heat.

The surface temperature of the ceramic elements 70 is about 1650° F. on a "high fire" setting and approximately 1000° F. on a "low fire" setting. This results in very fast cooking and provides a temperature which will vaporize and drive off all of the greases which drip onto the heating elements 70. Furthermore, this high temperature will also vaporize and carbonize the juices and greases which are retained immediately below the meat by the channels of the grids 181.

In a typical burner, approximately 20,000 BTU's per hour are generated by the burners and there is approximately 3,000 ports or holes 71 throughout the surface. There are approximately 440 square inches of grill cooking area for the two grates 180 and approximately 320 square inches of broiling surface for the gridle 300. The bake rack 173 has essentially the same construction of grids such as the grids 184 and, therefore, will also permit selective use either with the grids upright or inverted. Such a rack 173 provides approximately 130 square inches of additional cooking or warming surface. In the grill of the present invention, it is desirable to permit the grill to operate for above five minutes after the cooking has been completed so that any grease will be consumed and driven off.

The clean up of the grill is quite simple since it is easy to remove the drip pan 32 and it is also quite easy to remove the grates 180. Essentially no maintenance is required for the burners.

It is obvious to those skilled in the art that many variations may be made in the embodiments here chosen for the purspose of illustrating the present invention without departing from the scope thereof as defined by the appended claims.

I claim:

1. A grill assembly comprising:
   (a) a cabinet;
   (b) a source of combustible gas;
   (c) a gas burner assembly in said cabinet, said gas burner having a plenum box with a plenum chamber communicating with said source of combustible gas for receiving gas therefrom, said plenum box being supported by and disposed in the interior of said cabinet, said plenum box having an open upper portion open to said plenum chamber, a foraminous radiant burner element over said open upper portion, said radiant burner element being provided with plurality of gas passageways through which the combustible gas which enters said plenum chamber passes to the exterior upper surface of said burner element for burning at the upper surface of said burner element to generate heat and products of combustion;
   (d) a fire shield carried by said cabinet, said fire shield defining a channel above said element and through which the products of combustion pass from said element;
   (e) a stationary food supporting means disposed above said element for supporting items of food in spaced relationship to said burner element for being cooked by the heat generated by the combustion of said combustible gas at said of said burner.

2. The grill assembly defined in claim 1 wherein said food supporting means includes a grate provided with a plurality of spaced, parallel trough defining grids, the troughs of which open upwardly.

3. The grill assembly defined in claim 2 wherein said grids are U-shaped members having flat bases disposed in a common plane and upstanding, spaced, parallel flanges extending from the edges of said bases, the upper edges of said flanges terminating in a common, horizontal plane parallel to the plane of said bases for supporting said item of food, the space between said grate and said surface of said burner being essentially unobstructed, whereby the radiant heat from said burner heats portions of said item which are supported by said grids and wherein portions of fluids emanating from said item will be received by the bases of said grids and other fluids therefrom will fall by gravity onto said radiant burner element.

4. The grill assembly defined in claim 3 wherein each of said grids is provided with a hole in an end portion thereof through which liquids received in the troughs will be discharged, said holes being offset vertrically from the position of said burner element so that the fluids which pass through said holes do not drop onto said burner element.

5. The grill assembly defined in claim 3 wherein said grate is removably supported by said cabinet and said grate is selectively positionable in an upright position or in a position inverted therefrom.

6. The grill assembly defined in claim 1 wherein said food supporting means includes a deep fat fryer having walls and a bottom defining a liquid containing chamber and means for supporting said deep fat fryer within the confines of said fire shield.

7. The grill assembly defined in claim 1 wherein said food supporting means includes a rotisserie having a spit and a motor for rotating said spit, a hood carried by said cabinet, said hood having an interior above and communicating with the fire well of said fire shield, said motor being mounted on said hood and said hood journalling a portion of said spit, remote from said motor, for rotation over the fire well of said fire shield.

8. The grill assembly defined in claim 1 including a hood assembly disposed over said meat supporting member, said hood assembly having an access door hingedly mounted thereon, said access door and said access hood assembly defining a chamber aligned with and above the fire well of said fire shield.

9. The grill assembly defined in claim 1 including a smoker carried above said surface burner element, said smoker including a wood chip receiving chamber within which wood is deposited and being provided with holes through which the fumes from said wood pass for imparting a flavor to the item of food carried by said food supporting means.

10. A grill assembly comprising a cabinet, a source of combustible gas, a gas burner assembly disposed in said cabinet, said gas burner assembly having a plenum box defining a plenum chamber communicating with said source of gas for receiving gas therefrom, said plenum box being supported by said cabinet in the interior of said cabinet, and a foraminous infrared, ceramic, radiant burner disposed on said plenum box and having a plurality of holes communicating with said plenum chamber and through which said combustible gas passes for burning adjacent to the surface of said burner, said surface of said burner being disposed essentially in a horizontal position; and a grate disposed above said surface for receiving food to be cooked by the heat generated by said burner, said grate being vertically above said burner, said grate having spaced, grids through which liquid from said food may drop onto said burner and be vaporized by the heat of the burning gas and a assembly over said grate for temporarily closing the area above said grate so as to restrict the passage of the products of combustion out of the grill.

11. The grill assembly defined in claim 10 wherein said cabinet is a sheet metal member having side walls and a front wall and a back wall, a top plate disposed over the upper edge portions of said walls, said top plate having an open central portion above said burner element and wherein said food supporting means is a grate disposed in said open central portion.

12. The grill assembly defined in claim 10 wherein said grate extends over a larger area than the area of said burner element, said grate having a plurality of parallel trough members which receive the liquid dropped from the item of food being cooked therein and wherein each of said trough grids is provided with a hole through which the liquid passes, the hole being vertically spaced from said burner so that the liquids which pass through the holes will drop clear of said burner.

13. The grill assembly defined in claim 10 including a drip pan removably carried by said cabinet and positioned below the holes in said grids for receiving the liquid dripping from said holes.

14. The grill assembly defined in claim 13 wherein said drip pan is slideably carried by said cabinet and extends beneath said burner, said drip pan being removable from said cabinet.

15. The grill assembly defined in claim 10 wherein said source of combustible gas includes an LP gas tank carried within said cabinet and wherein said cabinet includes a hinged door for providing access to the interior of said cabinet.

16. The grill assembly defined in claim 10 wherein said hood assembly includes an access door hingedly connected thereto.

17. The grill assembly defined in claim 10 wherein said hood assembly has a hood member formed of sheet metal and includes a vertically disposed back panel, a pair of side panels connected to said back panel and wherein said cabinet includes a rectangular top plate having a rectangular opening which receives said grate, said hood member being of substantially the same dimensions as said rectangular opening and being disposed thereover, said hood member also including a top extending between the upper edges of said side panels and the upper edge of said back panel, a door hingedly mounted on the front edge portion of said top, said door also being formed of sheet metal and including a top hingedly connected to the top of said hood member, side panels and a front panel.

18. A grill assembly comprising:
(a) an upright support;
(b) a source of gas;
(c) a gas burner carried by said support and connected to said source of gas;
(d) said gas burner having a generally horizontally disposed foraminous burner element along its upper surface and through which gas passes for burning along the upper surface of said element;
(e) a gridiron carried by said support parallel to and directly above said burner, the space between said gridiron and said burner being essentially unobstructed, whereby the convection heat and the conduction heat from the burning of gas by said element is directed onto said gridiron, said gridiron having spaced grids provided with upwardly opening troughs and on which meat to be cooked is placed, said grids being disposed in positions vertically above said element so that drippings from said meat, which pass between said grids toward said element, are vaporized by the heat generated by said gas at the surface of said burner element, said troughs being sufficient to receive and retain portions of the drippings from said meat, said grids being sufficiently close to said burner that the drippings received by said troughs are vaporized immediately below said meat for imparting a flavoring to said meat.

19. The grill assembly defined in claim 18 wherein said support is an upright tubular cabinet surrounding said burner, said gridiron being carried by the upper end portion of said cabinet.

20. The grill assembly defined in claim 19 wherein said cabinet is a sheet metal rectangular member defining an upright rectangular back wall, a pair of opposed parallel side walls connected to the edges of said back wall, and a front panel joining the front edges of said side wall.

21. The grill assembly defined in claim 20 including opposed doors below said front panel and hingedly connected to said side walls.

22. The grill defined in claim 18 wherein said support is an upright sheet metal tubular member, and a sheet metal top plate having an opening inwardly of its edges, said top plate being removably carried by said member, said gridiron being removably carried in said opening of said top plate.

23. The grill defined in claim 22 including a sheet metal tubular hood over gridiron, and a top for said hood.

24. The grill defined in claim 23, wherein said hood is divided into a hood member and an acess door, said top of said hood being flat and generally horizontally disposed, a portion of said top being included with said hood member and a portion of said top being included with said access door, and a hinge for hingedly joining said portions of said top for permitting opening and closing of said access door.

25. The grill defined in claim 24 wherein said hood is a rectangular member and is removably received upon said top of said cabinet, said access door and said hood member having side panels which form the sides of said rectangular member, the panels of said access door and said hood member overlapping when said door is closed.

26. The grill assembly defined in claim 18 wherein said support is a tubular cabinet and including a tubular shield within and spaced from said tubular cabinet, said tubular shield being carried by said cabinet and protruding downwardly from the edge portions of said gridiron.

27. The grill assembly defined in claim 18 including a pair of opposed parallel brackets connected to said support and supporting said burner.

28. A grill assembly comprising:
(a) a hollow upright tubular member;
(b) bracket means within said tubular member for forming a burner assembly support;
(c) a burner assembly carried by said bracket means, said burner assembly having an upwardly facing burner element spaced from said tubular member;
(d) a top plate extending across the upper end of said tubular member, said top plate having an opening therein inwardly of the edges of said top plate;
(e) gridiron supported by and over the opening of said top plate and spaced from and over said burner element for supporting meat to be cooked by said burner element, the space between said burner element and said gridiron being essentially unobstructed; and
(f) means for supplying gas to said burner assembly.

29. The grill assembly defined in claim 28 wherein said burner assembly is provided with a plenum chamber and said burner element is an infrared radiant burner element, the surface of which is heated to incandescence when the burner element is lighted and burning.

30. The grill assembly defined in claim 29 wherein said means for supplying gas to said burner assembly includes a valve connected to a source of gas under pressure, a nozzle connected to said valve and projecting sidewise and parallel to said bracket means, said burner assembly having a pipe for introducing gas into said plenum chamber, said burner assembly also including means for receiving the end portion of said nozzle, said burner assembly being slidably received by said bracket and being movable toward said nozzle for positioning to receive the gas from said nozzle.

31. The grill assembly defined in claim 28 wherein said top plate is a sheet metal top having downwardly turned flanges overlapping the end portion of said tubular member, said top plate having inner flanges along the edge portions defining the opening in said top plate, said flanges providing support for said gridiron.

32. The grill assembly defined in claim 28 wherein said gridiron includes a pair of gridiron members each having spaced, parallel grids which protrude beyond its vertical position over said burner assembly, and including a drip pan positioned vertically to one side of said burner assembly, said gridiron members having means for directing grease from meat deposited on said gridiron to a position over said drip pan for dripping thereon.

33. The grill assembly defined in claim 28 including a tubular hood smaller than said tubular member and sufficiently large to cover said opening in said top plate, said hood being removably carried by said top plate, and a hinged access door for said tubular member.

34. The grill assembly defined in claim 33 wherein said hood includes a flat top divided so that a portion of said top is carried with said access door and a hinge along the divided portion of said top, said hinge permitting the divided protions of said top to lie coplaner when said door is closed and permitting the portion of said top which is with said access door to pivot to a position resting upon and generally parallel to said top when said door is opened.

35. The grill assembly defined in claim 28 wherein said tubular member is a sheet metal rectangular member defining an upright rectangular back wall, a pair of opposed parallel side walls connected to the edges of said back wall, and a front panel joining the front edges of said side wall.

36. The grill assembly defined in claim 35 including opposed doors below said front panel and hingedly connected to said side walls.

37. The grill assembly defined in claim 28 wherein said tubular member is an upright sheet metal member, and said top plate is a sheet metal plate having an opening inwardly of its edges and removably carried by said member, said gridiron being removably carried in said opening of said top plate.

38. The grill defined in claim 37 including a sheet metal tubular hood over said gridiron, and a top for said hood.

39. The gridle defined in claim 38, wherein said hood is divided into a hood member and an access door, said top of said hood being a flat and generally horizontally disposed sheet separated to provide a vent portion connected to said hood member and a front portion connected to said access door, and a hinge for hingedly joining said portions of said top for permitting opening and closing of said access door.

40. The grill defined in claim 39 wherein said hood is a rectangular member and is removably received upon said top of said tubular member, said access door and said hood member having side panels which form the sides of said rectangular member, the panels of said access door and said hood member overlapping when said door is closed.

41. The grill assembly defined in claim 39 including a second and smaller tubular member within and spaced from said tubular cabinet, said second tubular member being carried by said top plate and protruding downwardly from the edge portions of said gridiron.

* * * * *